US008688856B2

(12) United States Patent
McClain et al.

(10) Patent No.: US 8,688,856 B2
(45) Date of Patent: Apr. 1, 2014

(54) TECHNIQUES FOR MANAGING A NETWORK DELIVERY PATH OF CONTENT VIA A KEY

(75) Inventors: Carolyn B. McClain, Springville, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1521 days.

(21) Appl. No.: 11/338,065

(22) Filed: Jan. 24, 2006

(65) Prior Publication Data

US 2007/0174485 A1 Jul. 26, 2007

(51) Int. Cl.
G06F 15/173 (2006.01)
(52) U.S. Cl.
USPC ........... 709/238; 709/200; 709/225; 709/226; 709/227; 709/228; 709/229; 726/20; 726/30
(58) Field of Classification Search
USPC ......... 709/221, 237, 238, 223, 242, 235, 200, 709/219, 224, 225–229, 231; 713/163, 168, 713/171, 155, 166, 193, 153, 162; 370/395.5, 474, 237, 352, 392, 338, 370/400, 409; 380/270, 273, 277, 278; 705/7; 726/30, 20; 707/10
See application file for complete search history.

(56) References Cited

U.S. PATENT DOCUMENTS

| | | | | |
|---|---|---|---|---|
| 5,930,259 | A * | 7/1999 | Katsube et al. | 370/409 |
| 6,097,719 | A * | 8/2000 | Benash et al. | 370/352 |
| 6,157,644 | A * | 12/2000 | Bernstein et al. | 370/392 |
| 6,185,612 | B1 * | 2/2001 | Jensen et al. | 709/223 |
| 6,457,121 | B1 * | 9/2002 | Koker et al. | 712/300 |
| 6,507,908 | B1 * | 1/2003 | Caronni | 713/153 |
| 6,581,106 | B1 * | 6/2003 | Crescenzi et al. | 709/242 |
| 6,816,503 | B1 * | 11/2004 | Hashimoto et al. | 370/450 |
| 6,880,081 | B1 | 4/2005 | Itkis | |
| 6,973,499 | B1 | 12/2005 | Peden et al. | |
| 7,103,016 | B1 * | 9/2006 | Duffy et al. | 370/312 |
| 7,143,283 | B1 * | 11/2006 | Chen et al. | 713/153 |
| 7,237,123 | B2 * | 6/2007 | LeVine et al. | 713/193 |
| 7,362,709 | B1 * | 4/2008 | Hui et al. | 370/237 |
| 7,454,516 | B1 * | 11/2008 | Weinert et al. | 709/235 |
| 7,502,928 | B2 * | 3/2009 | Suzuoki et al. | 713/166 |
| 7,555,594 | B2 * | 6/2009 | Venkatachary | 711/108 |
| 7,587,587 | B2 * | 9/2009 | Buer et al. | 713/153 |
| 7,701,974 | B2 * | 4/2010 | Mayer et al. | 370/474 |
| 7,715,396 | B2 * | 5/2010 | Castro et al. | 370/392 |
| 7,739,497 | B1 * | 6/2010 | Fink et al. | 713/162 |
| 2002/0078227 | A1 * | 6/2002 | Kronenberg | 709/237 |

(Continued)

OTHER PUBLICATIONS

Pinkas,B., Efficient state updates for key management, Proceedings of the IEEE, vol. 92, Issue 6, Jun. 2004 pp. 910-917.*

(Continued)

Primary Examiner — Anthony Mejia
(74) Attorney, Agent, or Firm — Schwegman Lundberg & Woessner, P.A.

(57) ABSTRACT

Techniques for distributing content over a network via keys are provided. A key is associated with a particular destination or with a particular piece of content. A path management service derives and selectively communicates portions of a network path for moving the content to a destination on the basis of a value for a key. Any intermediate processing resource receives a next location within the path for forwarding the content from the path management service in response to presenting the key.

19 Claims, 4 Drawing Sheets

(56) References Cited

U.S. PATENT DOCUMENTS

| | | | |
|---|---|---|---|
| 2002/0095570 A1* | 7/2002 | Eldridge et al. | 713/155 |
| 2002/0154639 A1* | 10/2002 | Calvert et al. | 370/400 |
| 2003/0059053 A1* | 3/2003 | Medvinsky et al. | 380/277 |
| 2003/0076955 A1 | 4/2003 | Alve et al. | |
| 2003/0095663 A1* | 5/2003 | Nelson et al. | 380/270 |
| 2003/0235309 A1* | 12/2003 | Struik et al. | 380/278 |
| 2004/0085227 A1* | 5/2004 | Mikuriya et al. | 340/995.14 |
| 2004/0143666 A1* | 7/2004 | Xu et al. | 709/227 |
| 2005/0060547 A1* | 3/2005 | Saito et al. | 713/171 |
| 2005/0083974 A1* | 4/2005 | Mayer et al. | 370/474 |
| 2005/0188100 A1* | 8/2005 | Le Roux et al. | 709/238 |
| 2005/0204017 A1 | 9/2005 | Graves et al. | |
| 2005/0213768 A1* | 9/2005 | Durham et al. | 380/278 |
| 2005/0226248 A1* | 10/2005 | Modi et al. | 370/395.5 |
| 2005/0271211 A1* | 12/2005 | Takemura | 380/277 |
| 2006/0013171 A1* | 1/2006 | Ahuja et al. | 370/338 |
| 2006/0020807 A1* | 1/2006 | Aura et al. | 713/176 |
| 2006/0031936 A1* | 2/2006 | Nelson et al. | 726/23 |
| 2006/0087999 A1* | 4/2006 | Gustave et al. | 370/328 |
| 2006/0115089 A1* | 6/2006 | Carter et al. | 380/273 |
| 2006/0122771 A1* | 6/2006 | Mikuriya et al. | 701/210 |
| 2006/0177066 A1* | 8/2006 | Han et al. | 380/277 |
| 2006/0212325 A1* | 9/2006 | Levanon | 705/7 |
| 2006/0253461 A1* | 11/2006 | de Bonet | 707/10 |
| 2007/0036073 A1* | 2/2007 | Yamada et al. | 370/225 |
| 2007/0094321 A1* | 4/2007 | Nussey et al. | 709/200 |
| 2007/0162573 A1* | 7/2007 | Sutardja | 709/219 |
| 2007/0198689 A1* | 8/2007 | Sutardja | 709/223 |
| 2008/0034201 A1* | 2/2008 | Munger et al. | 713/153 |
| 2008/0232338 A1* | 9/2008 | Ji et al. | 370/338 |
| 2009/0151009 A1* | 6/2009 | Beser | 726/30 |
| 2009/0182873 A1* | 7/2009 | Spalink et al. | 709/224 |
| 2010/0153534 A1* | 6/2010 | O'Neal et al. | 709/223 |

OTHER PUBLICATIONS

Borcea et al., Self-routing in pervasive computing environments using smart messages Pervasive Computing and Communications, 2003. (PerCom 2003).*

Palomar et al., "Certificate-based Access Control in Pure P2P Networks", Peer-to-Peer Computing, 2006. P2P 2006. Sixth IEEE International Conference on Sep. 6-8, 2006 pp. 177-184.*

Griffioen et al. "On Information Hiding and Network Management." SIGCOMM'06 Workshops (2006).*

"CIS 659—Introduction to Network Security." Computer and Information Sciences | Welcome to UD Dept of CIS! Nov. 6, 2003. <http://www.cis.udel.edu/~sunshine/F03/CIS659/>.*

Calvert, K. L. and Griffioen, J. 2006. On information hiding and network management. In Proceedings of the 2006 SIGCOMM Workshop on internet Network Management (Pisa, Italy, Sep. 11-15, 2006). INM '06. ACM, New York, NY, 35-40.*

Hyung et al. "A Scheme for Improving WEP Key Transmission between APs in Wireless Environment." Computational Science and Its Applications—ICCSA 2004, 2004.*

Salgarelli, L.; Buddhikot, M.; Garay, J.; Patel, S.; Miller, S.; , "Efficient authentication and key distribution in wireless IP networks," Wireless Communications, IEEE, vol. 10, No. 6, pp. 52-61, Dec. 2003.*

Huang et al. "Secure Content Delivery Using Key Composition." IEEE Conference on Local Computer Networks 30th Anniversary. 20005. Web.*

"A Content-Centric Content Delivery Strategy", http://www.centerspan.com/technology/new_content_whitepaper.pdf, CenterSpan Communications Corporation,(Fall, 2002),1-7.

* cited by examiner

TECHNIQUES FOR MANAGING A NETWORK DELIVERY PATH OF CONTENT VIA A KEY

FIELD

The invention relates generally to networking and more particularly to techniques for distributing content over a network in response to one or more keys.

BACKGROUND

Increasingly individuals and enterprises are electing to communicate with one another over the Internet. Many transactions between parties over the Internet require some form of security to ensure that information is not tampered with or intercepted in some manner. Secure communications may involve encryption and/or use of secure communication protocols or connections, such as Virtual Private Networks (VPN's), Secure Sockets Layer (SSL), etc. Wireless communications are also becoming popular. Security with wireless communications may also entail encryption, such as use of a Wired Equivalent Privacy (WEP) protocol, etc.

Typically, when a message is sent over the Internet from a sender to a receiver, the underlying protocols and network devices generate a path from the sender to the receiver over the Internet. That path is carried or discoverable from the packets that comprise the message, as the message is transmitted over the Internet from the sender's device to the receiver's device.

Thus, there is path processing that takes place on each device identified within the path over the Internet. Moreover, each packet associated with a message reserves space to carry the path information. So, proper delivery of the message requires a certain amount of space and processing on each routing device identified within the path.

In recent years, devices, which connect to the Internet (e.g., phones, personal digital assistants (PDA's), navigation devices, etc.), have been made smaller and smaller and thus more portable and more acceptable to consumers. However, processor, memory, and storage resources are at a premium on such devices. As a result, these devices are not likely to be used as routing devices on the Internet and are generally not capable of such functions, since to do so would necessitate increased processor and memory capabilities to handle packet processing associated with conventional message distribution.

It should also be pointed out that even conventional routing devices can become fully loaded from the volume of traffic that those devices process. A substantial part of this load is associated with maintaining routing tables and processing path information associated with received packets. In fact, a plethora of software techniques and hardware designs have been dedicated to addressing packet routing throughput on the bases of packets carrying path information with the packets and the bases of network topology known and exposed to each routing enabled device.

In addition, conventional packets of information that carry path and party information can create security vulnerabilities for senders and receivers. That is, the mere fact that the particular sender is communicating with a particular receiver over the Internet may be confidential and if discovered could lead to some adverse circumstances for the parties involved.

For example, a central intelligence agency (CIA) agent or detective may be engaging in communications with an informer, such that if the identity of the agent, detective, or the informer is discovered and the fact that they are communicating with one another, then both or one of their lives or the operation may be in danger. If a packet is intercepted and the identity of parties is associated with that packet as a sender and receiver then potentially the relationship can be detected and thus compromised.

The destination of a packet, if discovered, may also present problems for parties engaged in secure communications, since discovery of the destination may allow the destination's Internet Service Provider to be discovered or may permit the eventual discovery of a physical location associated with the recipient. For example, an interceptor may want to more closely monitor a recipient's ISP for the recipient's communications or may want to attempt to track down the recipient and the recipient's device.

Therefore, there is a need for techniques that are capable of distributing messages over a network without carrying information about the parties engaged in the transactions and without carrying path information associated with routing the messages over the network.

SUMMARY

In various embodiments, techniques for distributing content via keys are presented. More specifically, and in an embodiment, a method for managing a delivery path of content via a key is provided. A key is received from a first node. A delivery path is acquired for a network in response to the key and the first node is instructed to forward content associated with the key and the key to a second node identified in the delivery path.

DETAILED DESCRIPTION

A "resource" includes a user, content, a processing device, a node, a service, a system, a directory, a data store, groups of users, combinations of these things, etc. A "node" or "participant" is a specific type of resource that desires to obtain content (another type of resource), desires to send content, or desires to forward content and the content's associated key to another node or participant over the network.

Additionally the term "participant" or "node" refers to a network enabled device (e.g., router (RT), access point (AP), range extender (RE), laptop, personal digital assistant (PDA), intelligent appliance, phone, etc.) or a network resource (e.g., service, application, system, etc.). Some participants, such as a RT, AP, or RE facilitate network connections and network services to other end-point (EP) devices or resources, such as a laptop, PDA, intelligent appliance, phone, etc. For example, a wireless RT may interface through a wired connection to an Internet Service Provider (ISP) and concurrently provide a wireless service to an EP within a predefined range or distance for purposes of interfacing the EP with the ISP. In this example, the RT and the EP are considered participants.

A number of the participants communicate with one another via a secure network. A secure network is one in which the participants implemented security protocols or other measures to ensure some level of security and/or privacy. In an embodiment, the secure network is implemented with Wired Equivalent Privacy (WEP) encryption keys.

In various embodiments, a special network participant is referred to as a "key distribution service." The key distribution service has a trusted relationship with the other participants of the network and provides a novel mechanism for distributing and managing keys of the network. Examples of key distribution services which may be used with the teachings presented herein may be found in U.S. Ser. No. 10/999,820 entitled "Key Distribution;" the disclosures of which is incorporated by reference herein.

The embodiments presented herein may be implemented in a variety of processing devices, network resources, software services, and the like. In an embodiment, the techniques presented herein are at least partially implemented in wireless RT's, AP's, and/or RE's. In yet other embodiments, the techniques are partially implemented as enhanced features of a key distribution service, such as the example key distribution services listed above.

Some embodiments may also be implemented as enhancements to an identity service. The identity service has a trusted relationship with the other participants of the network and may be enhanced to provide a novel mechanism for distributing content in response to keys. Examples of identity services which may be enhanced with the teachings presented herein may be found in U.S. Ser. No. 10/765,523 entitled "Techniques for Dynamically Establishing and Managing Authentication and Trust Relationships;" U.S. Ser. No. 10/767,884 entitled "Techniques for Establishing and Managing a Distributed Credential Store;" and U.S. Ser. No. 10/770,677 entitled "Techniques for Dynamically Establishing and Managing Trust Relationships;" the disclosures of which are incorporated by reference herein.

Various embodiments of this invention can be implemented in existing network architectures. For example, in some embodiments, the techniques presented herein are implemented in whole or in part in the Novell® network and proxy server products, email products, operating system products, and/or directory services products distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

Figure 1:
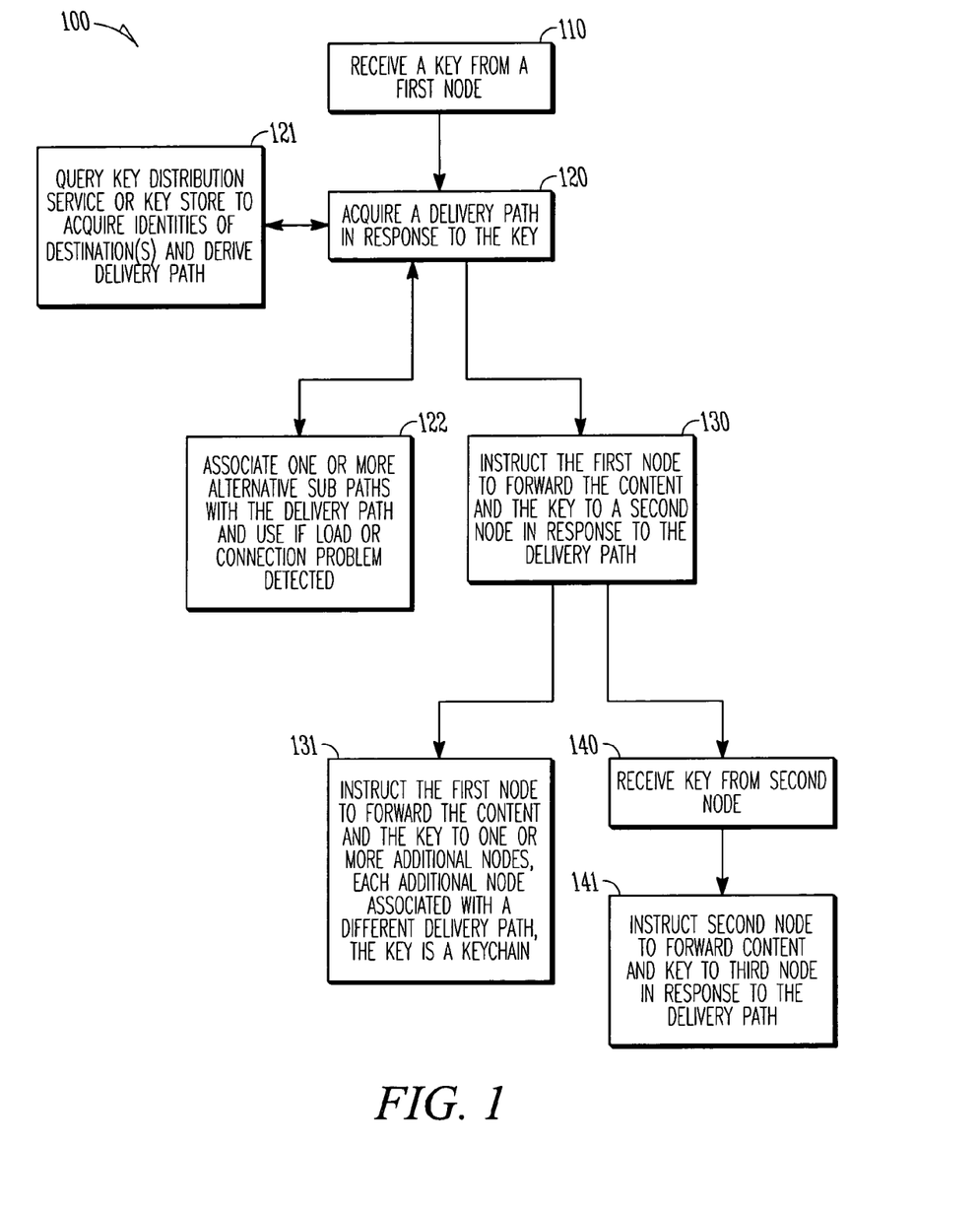
FIG. 1 is a diagram of a method for managing a delivery path of content via a key, according to an example embodiment.

FIG. 1 is a diagram of a method 100 for managing a delivery path of content via a key, according to an example embodiment. The method 100 (hereinafter "path management service") is implemented in a machine-accessible and readable medium. The path management service is operational over and processes within a network. The network may be wired, wireless, or a combination of wired and wireless.

Initially, a first node or participant desires to communicate with a destination node or group of destination nodes or participants over the network. Traditionally, such a communication would entail having the first node include an Internet Protocol (IP) address for the destination node as metadata with the message. The actual IP address is typically resolved by the underlying protocols into a specific location over the Internet. As will be demonstrated herein and below, there is no need to include or address messages having content via IP addresses; rather addressing and path resolution occurs via the path management service on the bases of keys and key chains associated with the message or content.

Accordingly, 110, the path management service receives a key from the first node or first participant. The content, which is associated with a message that the first node desires to communicate to a destination node, does not have to be received by the path management service; although it can be with some embodiments.

At 120, the path management service acquires a delivery path in response to the received key. A variety of mechanisms may be used to initially create or derive the delivery path. It is noted that the delivery path is maintained by the path management service and is not completely disclosed or communicated to any node that assists in delivering content from the first node to a final destination node over the network. That is, the path management service acts as a gatekeeper for the delivery path and, as will be demonstrated more completely below, selectively communicates next hop information to participating nodes as the key is represented by the participating nodes. But, the delivery path is not known or discoverable by any particular participating node. In some embodiments, the next hop information or the complete delivery path may be cached by the path management service and inspected and selectively communicated to nodes or participants when requested.

The key is associated with a particular destination node or group of destination nodes. This association permits the path management service to use the key presented by the first node to discover the identity or identities of the destination node(s). Examples of unique and dynamic associations between participants or nodes of a network were presented and described in the disclosures of the example key distribution services, which were described and incorporated by reference herein and above.

As an example, at 121, the path management service may query a key distribution service or a key store to acquire identities associated with the destination node or set of destination nodes. The identity is discovered from the value of the presented key. Once the identities of the destination nodes are known, a path deriving service or algorithm may be used by the path management service to generate or derive a delivery path over the network for moving a message with content from the first and initially requesting node to the destination node(s). An identity includes a discoverable IP address, such that once the received key is associated with participant identities, the IP addresses are discovered, and a path generating service provides one or more delivery paths from the first node to the destination node(s).

In some cases, at 122, the path management service may associate one or more alternative sub paths with the delivery path. That is, the delivery path that is derived and maintained by the path management service may include alternative sub paths or even policies, which may be dynamically enforced in the event that certain conditions occur during delivery of content over the network to the destination node(s). For example, sub paths and policies within the delivery path may indicate that the sub paths are to be used if load and/or connection problems are detected with originally planned sub paths within the delivery path. The path management service dynamically and in real time enforces the selection of sub paths within the delivery path on the bases of dynamically enforced and evaluated policies.

At 130, the path management service instructs the first and initial requesting node to forward its message with the desired content and with the key to a second node. The second node is identified from the derived delivery path. The first node is unaware of the delivery path. In fact, all the first node is aware of is that it wants to send content via a message to a destination node and that the destination node is associated with the key. The key is presented to the path management service and the path management service communicates a next hop address to the first node but not the full delivery path. Again, in some cases the next hop address and the delivery path may be cached by the path management service.

In some embodiments, at 131, the key may be associated with a keychain and with a group of destination nodes. Thus, there may be more than a single delivery path for any given piece of content being delivered over the network via a message from the first node. That is, each destination node may diverge at different points from a single derived delivery path or each destination node may have its own entirely different delivery path. In these cases, the path management service may instruct the first node to send the content and the key to multiple additional nodes in addition to the second node, such that each additional node is associated with a different delivery path. The same key or unique and different keys selected from a key chain may be used depending upon the desired destination node.

If the second node is not the destination node, then, at 140, the path management service may subsequently receive the key a second time from the second node. In response, at 141, the path management service inspects the delivery path and instructs the second node to forward the message having the content and the key to a third node. Again, the third node is a next hop address selected from the delivery path and the delivery path is managed by the path management service and not by the individual nodes that assist in facilitating the content through the network to the destination node(s).

The iteration depicted at 140-141 may continue until the destination node(s) receives the message having the content over the network. So, each node that receives the message having the content and the key requests assistance from the path management service on where to next forward the content and the key. The path management service maintains the delivery path and does not disclose it; rather the next hop address within the delivery path is communicated on an as-needed basis to the appropriate node in possession of the content and the key.

Thus, the delivery of the content is more secure than traditional approaches because an interceptor will not be able to figure out who sent the content or where it is directed to other than perhaps who is the next node that is to receive it. So, the identities of the sending and receiving parties are more securely maintained and not completely discoverable as it is with conventional approaches. Additionally, path processing and path information is not carried with the message or packets over the network. This permits for more memory and processing efficient packet routing over the network.

Figure 2:
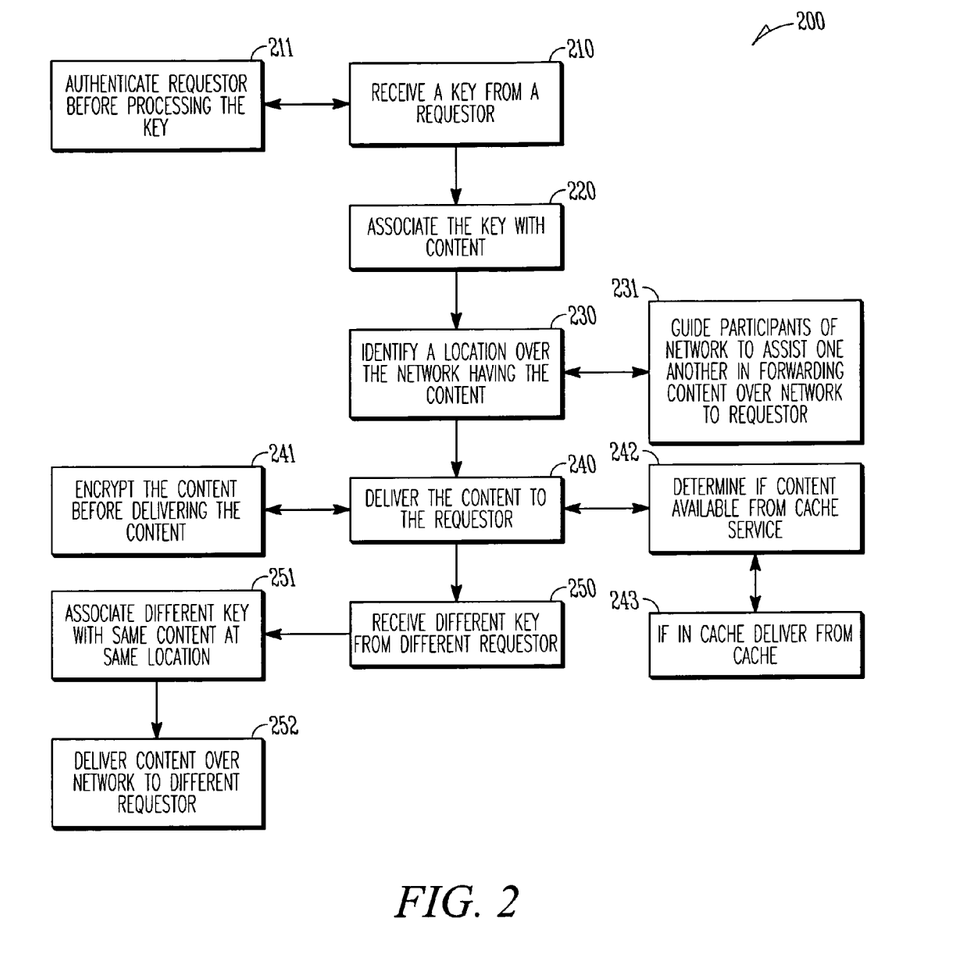
FIG. 2 is a diagram of method for distributing content in response to a key, according to an example embodiment.

FIG. 2 is a diagram of method 200 for distributing content in response to a key, according to an example embodiment. The method 200 (hereinafter "content delivery service" is implemented in a machine-accessible and readable medium and is operational over a network. The network may be wired, wireless, or a combination of wired and wireless.

In an embodiment, the content delivery service provides another mode of operation that may be added to the path management service represented by the method 100 of the FIG. 1. That is, the path management service provides for the discovery of a destination participant and derivation of a path through the network to that destination participant, whereas the content delivery service provides for the discovery of content in response to a key presented by a requester and the delivery of that content to the requester.

The content delivery service may still use and interface with the path management service to derive, manage, and communicate delivery paths for message and content communication; however, unlike the path management service the content delivery service may be used to discover a location of content over the network and not just an end point or destination node. Again, the processing of the content delivery service may be integrated into the path management service and used as a different mode of operation or as an enhancement to the path management service. So, the content delivery service does not have to be separate and distinct from the path management service; although it can be if desired.

At 210, the content delivery service receives a key from a requester. According to an embodiment, at 211, the content delivery service may authenticate the requestor before accepting or processing the key that is received from the requester. A requestor is a node or participant that desires to acquire some content over the network, such as the Internet. The precise location of the content is unknown to the requestor; however, the requester does know that the content is associated with a particular key. That key is presented to the content delivery service and the content delivery service acquires the content from its native location and delivers it or facilitates its delivery to the requester.

At 220, the content delivery service associates the key with the content that the requestor wants to acquire. Again, the content delivery service may use an external service or data store to house associations between keys and content in much the same manner that the path management service did with end point identities or destination identities and keys. The key's association to a particular piece of collection of content is then used to acquire a location for acquiring the content over the network. Accordingly, at 230, the location is identified over the network where the desired content may be obtained. In some embodiments, there may be multiple locations for acquiring the content and the content delivery service selects an optimal location from a list of available locations based on policy or dynamically evaluated circumstances.

At this point, the content delivery service has a desired location for acquiring the content on behalf of the requestor and also knows the IP address, key of the requester, and/or location of the requestor. Thus, a delivery path may be derived from moving the content from its location to the requestor over the network in manners that were described above with the path management service represented by the method 100 of the FIG. 1.

According to an embodiment, at 231, the content delivery service may guide network participants to assist one another in forwarding the content from its location to the requestor using an independent and closely held delivery path. This processing may be achieved by requesting the assistance of the path management service, as discussed above with the method 100 of the FIG. 1.

In another situation, at 240, the content delivery service delivers the content itself from the content's network location to the requestor. According to an embodiment, at 241, the content may not have been originally encrypted at its native location and thus the content delivery service may be have optionally encrypted the content before it is delivered over the network to the requestor.

At 242, the content delivery service may also determine if the content being requested is available from a cache service, and if so, at 243, the content may be directly delivered from cache to the requestor. So, content may be cached within an environment of the content delivery service or by a caching service that communicates with the content delivery service.

The caching may improve delivery throughput experienced by the requestor of the content.

In an embodiment, at 250, the content delivery service may receive a different key from a different requestor. At 251, the different key may be associated with the same content located at the same network location. At 252, the content may be simultaneously delivered or subsequently delivered to the different requestor in response to the different key. The embodiment depicted at 250-252 reflect a situation where content is associated with multiple different keys or a single key chain having multiple keys. Different requesters may have different ones of the keys included in the key chain, but the content delivery service can resolve and find the content and delivery it to the requestors over the network.

The processing of the content delivery service demonstrates how content may be discovered and acquired over a network on the basis of a key association rather than on the basis of an IP address. The path management service of the method 100 compliments this approach by permitting an end point or destination to be discovered on the basis of the key. With both services (method 100 and method 200) a delivery path is hidden and managed by the services and only selectively disclosed on an as-needed basis to the participating nodes.

Figure 3:
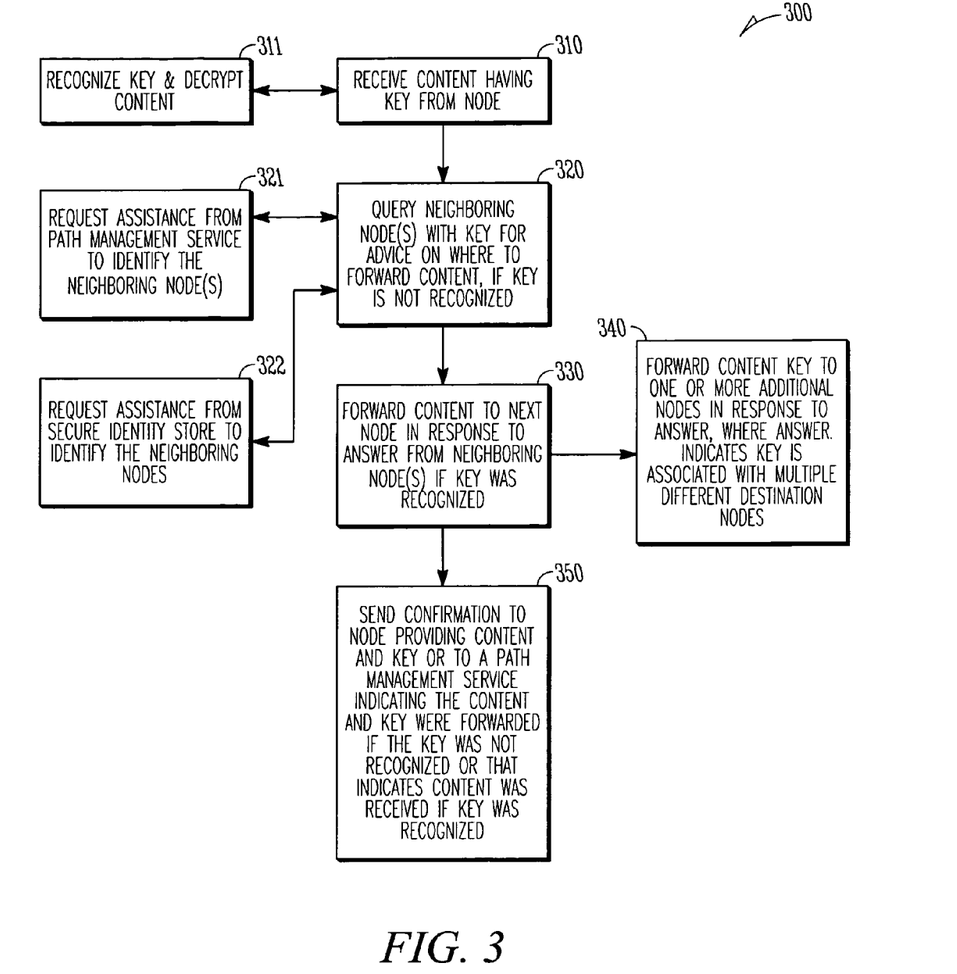
FIG. 3 is a diagram of a method for forwarding content and an associated key over a network, according to an example embodiment.

FIG. 3 is a diagram of a method 300 for forwarding content and an associated key over a network, according to an example embodiment. The method 300 (hereinafter "participant service" is implemented in a machine-accessible and readable medium and is operational over a network. The network may be wired, wireless, or a combination of wired and wireless. In an embodiment, the participant service represents processing of participants that interact with the path management service represented by the method 100 of the FIG. 1 and that interact with the content delivery service represented by the method 200 of the FIG. 2.

Whereas the path management service and the content delivery service of the methods 100 and 200, respectively, describe processing from the perspective of a centralized path and key service, the participant service presents processing associated with a participating node over the network that may originate a message, may forward a message, or may be a target recipient of a message.

At 310, the participant service receives content and a key with a message from another node of the network. If the key is recognized, at 311, then the participant service identifies the content as being directed to it and decrypts the content for consumption.

However, at 320, if the key is not recognized, then the participant service queries neighboring nodes with the key seeking advice on where to next forward the content. This may be achieved in a variety of manners.

For example, at 321, the query may be made to a node identified as a path management service, such as the path management service represented by the method 100 of the FIG. 1. The path management service may identify the neighboring nodes that the participant service may seek assistance from or may actually identify the next node for the participant service to forward the content and key to within the network.

As another example, at 322, the participant service may request assistance from a secure identity store or identity service. Some example identity services were presented and incorporated by reference above.

In still other situations, the participant service may be preconfigured or dynamically instructed to query specific neighboring nodes for advice on where the content and key are to be forwarded.

The purpose of querying a neighboring node is to discover a next hop address in a delivery path from the content and the key being processed by the participant service. The participant service does not know the full delivery path. In fact, all the participant service can discern is who provided the content and key and eventually who is to next receive the content and the key. The participant service may interact with a path management service to determine the next hop node or may query neighbors who are designed to interact with the path management service and discover the next hop address or participant.

Once the next hop or next node is known to the participant service, at 330, the participant service forwards the content and the key to the next node. Thus, if the participant service is not itself a destination node of the content, then the participant service facilitates forwarding the content and the key to other nodes for purposes of following a delivery path. The delivery path selectively maintained and managed by a path management service and/or content delivery service, such as the ones represented and described with the methods 100 and 200 of the FIGS. 1 and 2. In some cases, a participant service may not even be aware of the path management or content delivery service and in such cases, the participant service queries neighboring nodes to get advice on where to next send the content and the key.

According to an embodiment, at 340, an answer supplied from a neighboring node in response to the advice sought may indicate that the participant service is to forward the content and the key to multiple different nodes. This may occur when there are multiple paths and the destination is actually a collection of nodes rather than a single node. Examples of this situation were presented and described above.

In an embodiment, at 350, the participant service may also send a confirmation to the node that originally provided the content and the key or may send a confirmation to the path management service. The confirmation permits some reasonable degree of tracking to detect where content forwarding fails or becomes a bottle neck. That is, confirmations may permit a path management service to detect where a route of content failed and with whom it failed. It may also permit the path management service to evaluate metrics and determine that certain nodes are problematic of bottlenecks and should be avoided in the future. The confirmations may also be used for logging and reporting purposes.

Figure 4:
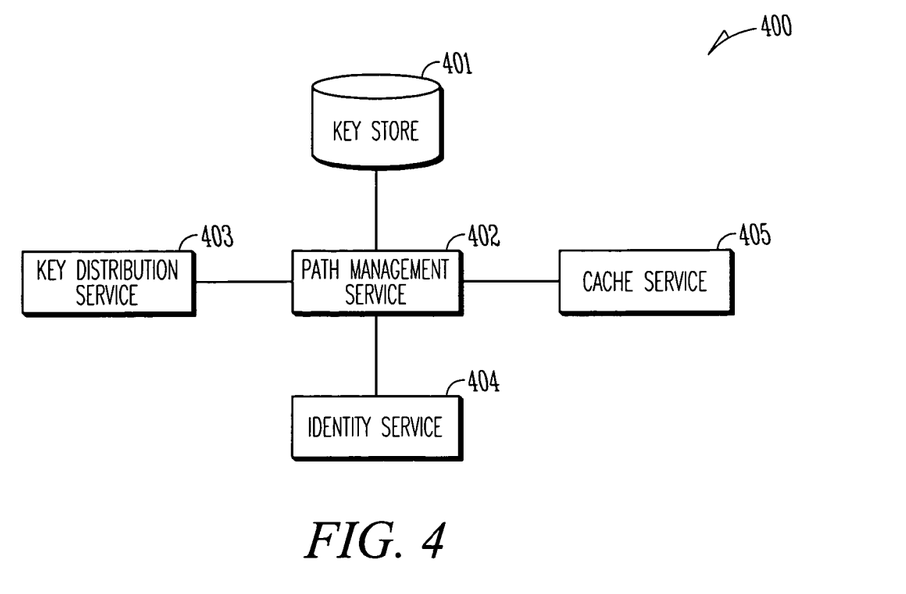
FIG. 4 is a diagram of a key content distribution system, according to an example embodiment.

FIG. 4 is a diagram of a key content distribution system 400, according to an example embodiment. The key content distribution system 400 is implemented in a machine-accessible and readable medium and is accessed and processed over a network. The network may be wired, wireless, or a combination of wired and wireless. The key content distribution system 400 implements, among other things, the path management service represented by the method 100 of the FIG. 1 and the content delivery service represented by the method 200 of the FIG. 2. Moreover, the key content distribution system 400 interacts with the participant service represented by the method 300 of the FIG. 3.

The key content distribution system 400 includes a key store 401 and a path management service 402. The key content distribution system 400 may also include a key distribution service 403, an identity service 404, and/or a cache service 405. Each of these will now be discussed in turn.

The key store 401 includes associations between resources. A resource may be a node, a device, a participant forwarding content, a sender of content, a recipient of content, or even the content itself. The associations link keys or key chains to specific combinations or resources. The key store 401 may also include IP addresses associated with each of the resources or it may include a name of a service that can supply an IP address for a particular resource.

The key store 401 may be local and within the local environment of the path management service 402. Alternatively, the key store may be external and may be an external resource or service that the path management service 402 communicates with over a wide area network (WAN), such as the Internet.

The path management service 402 is for deriving and managing delivery paths over the network for moving the content from either its native location or from a sender to a recipient destination or a requestor's destination. Thus, the path management service 402 may be viewed as the path management service represented by the method 100 of the FIG. 1 and may also be viewed as the content delivery service represented by the method 200 of the FIG. 2.

The path management service 402 selectively discloses on an as-needed basis the identities of next resources that are to be supplied with content and a key associated with a message, if the transaction being processed by the path management service 402 is one in which a sender is communicating a message having content to a recipient via a key. If the recipient is a requester, then the key does not have to accompany the content, if the path management service 402 is directly supplying the content to the requestor and is not enlisting the services of over participating resources.

The path management service 402 may also pre-configure a number of the resources represented as intermediate nodes, such that these intermediate nodes are supplied identities to their neighboring nodes for purposes of seeking advice when a particular piece of content and key are received for processing. Examples of such a situation were discussed above with the participating service represented by the method 300 of the FIG. 3.

The path management service 402 may interact or solicit assistance from a variety of services, such as a key distribution service 403, an identity service 404, and/or a cache service 405.

According to an embodiment, the key distribution service 403 dynamically distributes keys to the resources over the network. Keys may be dynamically modified, deleted, and added by the key distribution service. The associations between keys and the identities of the resources are managed by the key distribution service 403 and housed in the key store 401. Examples of key distribution services 403 were provided above and incorporated by reference above.

In another embodiment, the identity service 404 is used to supply identities for keys. That is, the keys may be maintained in secrecy by an identity service 404 and discovered by the path management service 402 if the path management service 402 is authorized by policy and authenticated to the identity service 404. In such a situation, the path management service 402 may keep its own version of the key store 401 in synchronization via interactions with the identity service 404. Examples of an identity service 404 were discussed and incorporated by reference above.

In yet another embodiment, the path management service 402 may interact with a cache service 405. The cache service 405 may securely cache content for the path management service 402, such that the path management service 402 may delivery content directly from cache if requested and if non stale within the cache. Examples of this were discussed above with respect to the content delivery service represented by the method 200 of the FIG. 2.

It is now understood how content associated with messages or desired content may be moved over delivery paths to end point destinations or to requestors via keys associated with the end points or the content and not via traditional IP addresses. The delivery paths to facilitate the content delivery is maintained in secret and managed by a path management service 402 and selectively communicated to resources on an as-needed basis.

Dynamically distributed keys are managed and associated with delivery paths. These keys may be modified in real time and are distributed and managed by key distribution services, such as the key distribution services described and incorporated by reference herein and above.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method to execute on a processing device, comprising:

receiving, by the processing device, a key from a first node;

acquiring, by the processing device, a delivery path for a network in response to the key, the delivery path securely managed and selectively communicated to the first node participating in routing content to the destination node via the delivery path, the first node does not have an Internet Protocol (IP) address of a destination node for which the content is to sent over the network, and the key is used by the method processing to discover an identity of the destination node, the identity is discovered based on a value for the key, once the identity is known, the method generates the delivery path for moving a message with the content over the network from the first node to the destination node, the message does not include path processing information and does not include path information, the message includes the content and the key and a particular address to a next node in the delivery path; and instructing, by the processing device, the first node to forward the content associated with the key and the key to a second node, the second node is only communicated to the first node as a next hop addresses that is selectively identified from the delivery path, the first node cannot discover the delivery path and only is provided the next hop address for purposes of routing the content to the next hop address along with the key, the first, second, next, and destination nodes do not perform path processing for the content and do not have the path processing information.

2. The method of claim 1 further comprising:

receiving, by the processing device, the key from the second node; and instructing, by the processing device, the second node to forward the content and the key to a third node, wherein the third node is communicated to the second node as another next hop address that is selectively identified from the delivery path.

3. The method of claim 2 further comprising, continuing to instruct, by the processing device, one or more additional nodes to forward the content and the key along within the network to next nodes associated with other next hop addresses until a destination node defined in the delivery path is reached.

4. The method of claim 1, wherein instructing further includes instructing the first node to forward the content and the key to one or more additional nodes, wherein each additional node is associated with a different delivery path and wherein the key is a keychain.

5. The method of claim 1, wherein acquiring further includes querying a key management service or key store with the key to acquire one or more identities associated with one or more destination nodes and using the one or more identities along with an identity of the first node to derive the delivery path from a topology of the network, the delivery path at least includes the second node.

6. The method of claim 1, wherein acquiring further includes associating one or more alternative sub-paths within the delivery path.

7. The method of claim 6 further comprising accessing the one or more alternative sub-paths when a load or connect problem is detected a particular next node, wherein the second node is associated with one of the alternative sub-paths of the delivery path.

8. A machine-implemented method to execute on a processing device, comprising:
receiving, by the processing device, a key from a requestor, the key is provided by the requestor to acquire content over a network but a location for the content over the network is unknown to the requestor;
associating, by the processing device, the key with content by using a data store that houses an association between the key and the content, the association is also used to acquire the location for the content over the network;
identifying, by the processing device, the location over a network for the content; and
delivering, by the processing device, the content to the requestor via a delivery path that moves the content from the location over the network to the requestor using participants, each participant assists in routing the content over a portion of the delivery path and each participant is only aware of and provided a next hop address that the content is to be delivered to within the delivery path but each participant cannot discover the delivery path and each participant is unaware of a final destination node for the content, the delivery path is derived by the method processing using an Internet Protocol (IP) address of the requestor and the location of the content on the network, the content moved via a message that includes the content, the key, and a next address for a next processing node, the message lacks any path processing and the message lacks any path information, and the participants do not perform path processing for the content and do not have the path information.

9. The method of claim 8 further comprising, authenticating, by the processing device, the requestor before processing the received key.

10. The method of claim 8 further comprising, encrypting, by the processing device, the content before delivering the content to the requestor from the location.

11. The method of claim 8, wherein delivering further includes guiding the participants of the network from the location to assist one another in forwarding the content over the network to the requestor.

12. The method of claim 8 further comprising:
receiving, by the processing device, a different key from a different requestor;
associating, by the processing device, the different key with the same content at the same location; and
delivering, by the processing device, the content over the network to the different requestor.

13. The method of claim 8, wherein delivering further includes:
determining if the content is available from a cache service before checking the location for the content; and
delivering the content from cache if available, otherwise delivering from the location.

14. A machine-implemented method to execute on a processing device, comprising:
receiving, by the processing device, content having a key from a node;
querying, by the processing device, one or more neighboring nodes with the key for advice on where to forward the content next within a network if the key is not recognized; and
forwarding, by the processing device, the content through the network with the key to a next node in response to an answer from at least one of the one or more neighboring nodes if the key is not recognized, a delivery path for the content is separately and securely managed and is derived by using the key to discover an identity of a destination node that is to receive the content and using the identity of the destination node along with an initial requestor IP address to generate the delivery path over the network, just the node sending the content and the next node are known by a network participant when the content is forwarded from the network participant to the next node, the network participant assist in routing the content to a final destination node that is not known to the network participant, the content routed via a message that includes the content, the key, and an address to a next processing node and the message lacks any path processing and the message lacks any path information, the node, the neighboring nodes, and the destination node do not perform path processing for the content and do not have the path processing information.

15. The method of claim 14 further comprising:
recognizing, by the processing device, the key; and
decrypting, by the processing device, the content in response to recognizing the key.

16. The method of claim 14, wherein querying further includes requesting assistance from a path management service to initially identify the one or more neighboring nodes to query.

17. The method of claim 14, wherein querying further includes requesting assistance from an identity store to acquire identities for the one or more neighboring nodes before querying the one or more neighboring nodes for advice.

18. The method of claim 14, wherein forwarding further includes forwarding the content to one or more additional nodes in response to the answer, wherein the answer indicates the content having the key is associated with multiple different destination nodes, and wherein the key is a keychain having multiple different keys associated with it.

19. The method of claim 14 further comprising, sending, by the processing device, a confirmation to at least one of the node that provided the content with the key and a path management service, wherein the confirmation indicates that the content and the key were forwarded if the key was not recognized or indicates that the content was properly received if the key was recognized.

* * * * *

UNITED STATES PATENT AND TRADEMARK OFFICE
CERTIFICATE OF CORRECTION

PATENT NO.         : 8,688,856 B2                                              Page 1 of 1
APPLICATION NO. : 11/338065
DATED              : April 1, 2014
INVENTOR(S)        : McClain et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1667 days.

Signed and Sealed this
Thirtieth Day of May, 2017

Michelle K. Lee
*Director of the United States Patent and Trademark Office*